United States Patent
Akahane

(10) Patent No.: US 11,505,168 B2
(45) Date of Patent: Nov. 22, 2022

(54) BRAKING FORCE CONTROL APPARATUS FOR A VEHICLE

(71) Applicant: Toyota Jidosha Kabushiki Kaisha, Toyota (JP)

(72) Inventor: Satoru Akahane, Machida (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 352 days.

(21) Appl. No.: 16/774,447

(22) Filed: Jan. 28, 2020

(65) Prior Publication Data
US 2020/0247374 A1 Aug. 6, 2020

(30) Foreign Application Priority Data
Feb. 1, 2019 (JP) .............................. JP2019-017278

(51) Int. Cl.
*B60T 8/1755* (2006.01)
*B60T 7/12* (2006.01)
*B60T 7/04* (2006.01)

(52) U.S. Cl.
CPC ............ *B60T 8/1755* (2013.01); *B60T 7/042* (2013.01); *B60T 7/12* (2013.01); *B60T 2220/04* (2013.01); *B60T 2230/04* (2013.01)

(58) Field of Classification Search
CPC .................................. B60T 7/042; B60T 7/22
USPC ...................................................... 701/70
See application file for complete search history.

(56) References Cited

U.S. PATENT DOCUMENTS

| 5,021,957 A * | 6/1991 | Yoshino ................ B60T 8/4031 303/113.5 |
| 6,742,850 B1 | 6/2004 | Eckert et al. |
| 7,167,783 B2 * | 1/2007 | Park ....................... B60W 20/11 701/22 |
| 2002/0030408 A1 * | 3/2002 | Niwa ....................... B60T 8/267 903/918 |
| 2002/0180266 A1 * | 12/2002 | Hara ................ B60W 30/18109 903/918 |
| 2005/0057095 A1 * | 3/2005 | Hac .......................... B60T 8/885 303/122 |

(Continued)

FOREIGN PATENT DOCUMENTS

| DE | 10116353 B4 * | 3/2006 | ............ B60T 8/1766 |
| DE | 102020112232 A1 * | 11/2020 | .............. B60L 3/102 |

(Continued)

*Primary Examiner* — Atul Trivedi
(74) *Attorney, Agent, or Firm* — Dinsmore & Shohl LLP

(57) ABSTRACT

First target braking forces for front and rear wheels are calculated by distributing a target braking force of automatic braking to the front and rear wheels at a first front/rear wheel distribution ratio when braking operation is started by a driver during execution of the automatic braking control, second target braking forces for the front and rear wheels are calculated by distributing the braking force requested by the driver to the front and rear wheels at a second front/rear wheel distribution ratio preset to be different from the first front/rear wheel distribution ratio such that a pitch moment applied to a vehicle body due to braking forces of the front and rear wheels becomes zero, and braking forces of the front and rear wheels are controlled so as to be sums of the first and second target braking forces of the front and rear wheels, respectively.

3 Claims, 4 Drawing Sheets

(56) References Cited

U.S. PATENT DOCUMENTS

| | | | | |
|---|---|---|---|---|
| 2006/0220453 | A1* | 10/2006 | Saito | B60W 10/184 |
| | | | | 303/152 |
| 2007/0018499 | A1* | 1/2007 | Kokubo | B60L 7/14 |
| | | | | 303/151 |
| 2009/0005945 | A1 | 1/2009 | Takeda et al. | |
| 2009/0012686 | A1* | 1/2009 | Maeda | B60T 8/1755 |
| | | | | 701/70 |
| 2013/0226410 | A1* | 8/2013 | Narita | B60W 10/184 |
| | | | | 701/41 |
| 2013/0231840 | A1* | 9/2013 | Watanabe | B60T 8/28 |
| | | | | 701/70 |
| 2015/0158493 | A1* | 6/2015 | Nakatsu | B60W 10/22 |
| | | | | 701/22 |
| 2016/0159225 | A1* | 6/2016 | Nakatsu | B60L 15/2009 |
| | | | | 701/70 |
| 2016/0236672 | A1* | 8/2016 | Yanagida | B60W 10/06 |
| 2018/0154875 | A1* | 6/2018 | Takahashi | B60L 7/18 |
| 2019/0106110 | A1* | 4/2019 | Yoshida | B60L 7/26 |
| 2019/0143955 | A1* | 5/2019 | Watanabe | B60W 10/119 |
| | | | | 701/69 |
| 2020/0094798 | A1* | 3/2020 | Hara | B60T 8/17616 |

FOREIGN PATENT DOCUMENTS

| | | | | |
|---|---|---|---|---|
| FR | 2905656 A1 | * | 3/2008 | ............. B60T 13/20 |
| FR | 2924082 A3 | * | 5/2009 | ............. B60T 7/042 |
| JP | H06321077 A | * | 11/1994 | ............. B60T 8/24 |
| JP | 2006-111075 A | | 4/2006 | |
| JP | 2006182050 A | * | 7/2006 | |
| JP | 2009-006828 A | | 1/2009 | |
| JP | 2009-273275 A | | 11/2009 | |
| JP | 4884626 B2 | | 2/2012 | |

\* cited by examiner

BRAKING FORCE CONTROL APPARATUS FOR A VEHICLE

CROSS-REFERENCE TO RELATED APPLICATION

This application claims priority to Japanese Patent Application No. JP2019-17278 filed on Feb. 1, 2019, the content of which is hereby incorporated by reference in its entirety into this application.

BACKGROUND

1. Technical Field

The present disclosure relates to a braking force control apparatus for a vehicle such as an automobile.

2. Description of the Related Art

In the art of a vehicle such as an automobile, automatic braking control is known which automatically applies a braking force to the vehicle as required, such as constant speed traveling control. Since an application of a braking force by the automatic braking control is performed regardless of presence or absence of a driver's braking intention, when the driver determines that braking different from that by the automatic braking control is necessary, he or she performs braking operation even if the automatic braking control is being performed.

When braking operation is performed by a driver in a situation where braking is being performed by the automatic braking control, that is, when overriding braking operation is performed, control mode of the braking force must be switched from braking by the automatic braking control to braking based on the driver's braking operation. For example, in FIG. 3 and the like in Japanese Patent No. 4884626, an example of switching of control of a braking force control mode from the braking by the automatic braking control to the braking based on the driver's braking operation is described.

In switching a braking force control mode, transition is necessary from a situation where only braking forces by the automatic braking control are generated to a situation where only braking forces based on a braking operation are generated through a situation where both braking forces by the automatic braking control and braking forces based on the braking operation are generated. Accordingly, it is inevitable that a braking force of an entire vehicle increases and then decreases.

Generally, a front/rear wheel distribution ratio in the control of braking forces is constant. Therefore, as will be described in detail later, when so-called override braking operation is performed and a braking force of a vehicle is increased and decreased by switching the braking force control mode, a pitch attitude of a vehicle body fluctuates due to the increase and decrease of the braking force, which may cause an occupant or occupants of the vehicle to feel uncomfortable.

Notably, it is known that a nose dive is reduced and changes in pitch attitude of a vehicle body are reduced by controlling a front/rear wheel distribution ratio of braking forces when a driver performs braking operation to brake a vehicle. However, this control cannot reduce a fluctuation of a pitch attitude of the vehicle body when a braking force control mode is switched.

SUMMARY

The present disclosure provides a braking force control apparatus for a vehicle that is improved such that a fluctuation of a pitch attitude of a vehicle body when an override braking operation is performed by a driver and a braking force control mode is switched becomes smaller than before.

According to the present disclosure, a braking force control apparatus for a vehicle is provided that comprises: a braking device configured to change a front/rear distribution of braking forces, and a control unit configured to execute automatic braking control for controlling the braking device in which, when there is a request for automatic braking from a traveling control device, first target braking forces of front and rear wheels are calculated by distributing a target braking force of the entire vehicle of the automatic braking to the front and rear wheels at a first front/rear wheel distribution ratio, and the braking device is controlled such that braking forces of the front and rear wheels become the first target braking forces of the front and rear wheels, respectively.

The control unit stores a second front/rear wheel distribution ratio that is set in advance to a value different from the first front/rear wheel distribution ratio such that a pitch moment applied to a vehicle body due to braking forces of the front and rear wheels is a value within a predetermined range including zero, and is configured to, when a driver starts braking operation during execution of the automatic braking control, calculate second target braking forces of the front and rear wheels by distributing a braking force of the entire vehicle required by the driver to the front and rear wheels at the second front/rear wheel distribution ratio and control the braking device such that a braking force of the front wheels is a sum of the first and second target braking forces of the front wheels and a braking force of the rear wheels is a sum of the first and second target braking forces of the rear wheels.

According to the above configuration, when a driver starts braking operation during execution of the automatic braking control, second target braking forces of the front and rear wheels are calculated by distributing a braking force of the entire vehicle required by the driver to the front and rear wheels at the second front/rear wheel distribution ratio. The second front/rear wheel distribution ratio is set in advance to a value different from the first front/rear wheel distribution ratio such that a pitch moment applied to the vehicle body due to braking forces of the front and rear wheels is a value within the predetermined range including zero.

Therefore, even if the braking device is controlled such that a braking force of the front wheels is a sum of the first and second target braking forces of the front wheels and a braking force of the rear wheels is a sum of the first and second target braking forces of the rear wheels, a pitch moment applied to the vehicle body due to braking forces of the front and rear wheels becomes the value within the predetermined range including zero. Accordingly, a variation of a pitch attitude of the vehicle body when override braking operation is performed by the driver and the braking force control mode is switched can be made smaller than in a conventional case, and the possibility that an occupant or occupants of the vehicle may feel discomfort can be reduced.

In one aspect of the present disclosure, the control unit is configured to calculate a third front/rear wheel distribution ratio which gradually changes from the second front/rear wheel distribution ratio to the first front/rear wheel distribution ratio over a second predetermined time when a first predetermined time has elapsed from a time point when the driver starts the braking operation, calculate third target braking forces of the front and rear wheels by distributing a braking force of the entire vehicle required by the driver to the front and rear wheels at the third front/rear wheel distribution ratio, gradually reduce a target braking force of the entire vehicle of the automatic braking to zero over the second predetermined time, and control the braking device such that a braking force of the front wheels is a sum of the first and third target braking forces of the front wheels and a braking force of the rear wheels is a sum of the first and third target braking forces of the rear wheels.

According to the above aspect, when the first predetermined time has elapsed from a time point when the driver starts the braking operation, a third front/rear wheel distribution ratio is calculated which gradually changes from the second front/rear wheel distribution ratio to the first front/rear wheel distribution ratio over the second predetermined time. Third target braking forces of the front and rear wheels are calculated by distributing a braking force of the entire vehicle required by the driver to the front and rear wheels at the third front/rear wheel distribution ratio. In addition, the braking device is controlled such that a braking force of the front wheels is a sum of the first and third target braking forces of the front wheels and a braking force of the rear wheels is a sum of the first and third target braking forces of the rear wheels.

Therefore, the third front/rear wheel distribution ratio is calculated such that it gradually changes from the second front/rear wheel distribution ratio to the first front/rear wheel distribution ratio over the second predetermined time. Further, third target braking forces of the front and rear wheels are calculated by distributing a braking force of the entire vehicle required by the driver to the front and rear wheels at the third front/rear wheel distribution ratio. Accordingly, when the target braking force of the entire vehicle of the automatic braking is gradually reduced to zero over the second predetermined time, the possibility that the pitch attitude of the vehicle body changes due to the braking force required by the driver can be reduced and the possibility that an occupant or occupants of the vehicle may feel discomfort can be reduced.

In another aspect of the present disclosure, the second front/rear wheel distribution ratio is preset such that a pitch moment applied to the vehicle body due to braking forces of the front and rear wheels is zero.

According to the above aspect, the second front/rear wheel distribution ratio is preset such that a pitch moment applied to the vehicle body due to braking forces of the front and rear wheels is zero. Accordingly, a variation of the pitch attitude of the vehicle body when override braking operation is performed by the driver and the braking force control mode is switched can be prevented, and an occupant or occupants of the vehicle can be prevented from feeling discomfort.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

Embodiment

Figure 1:
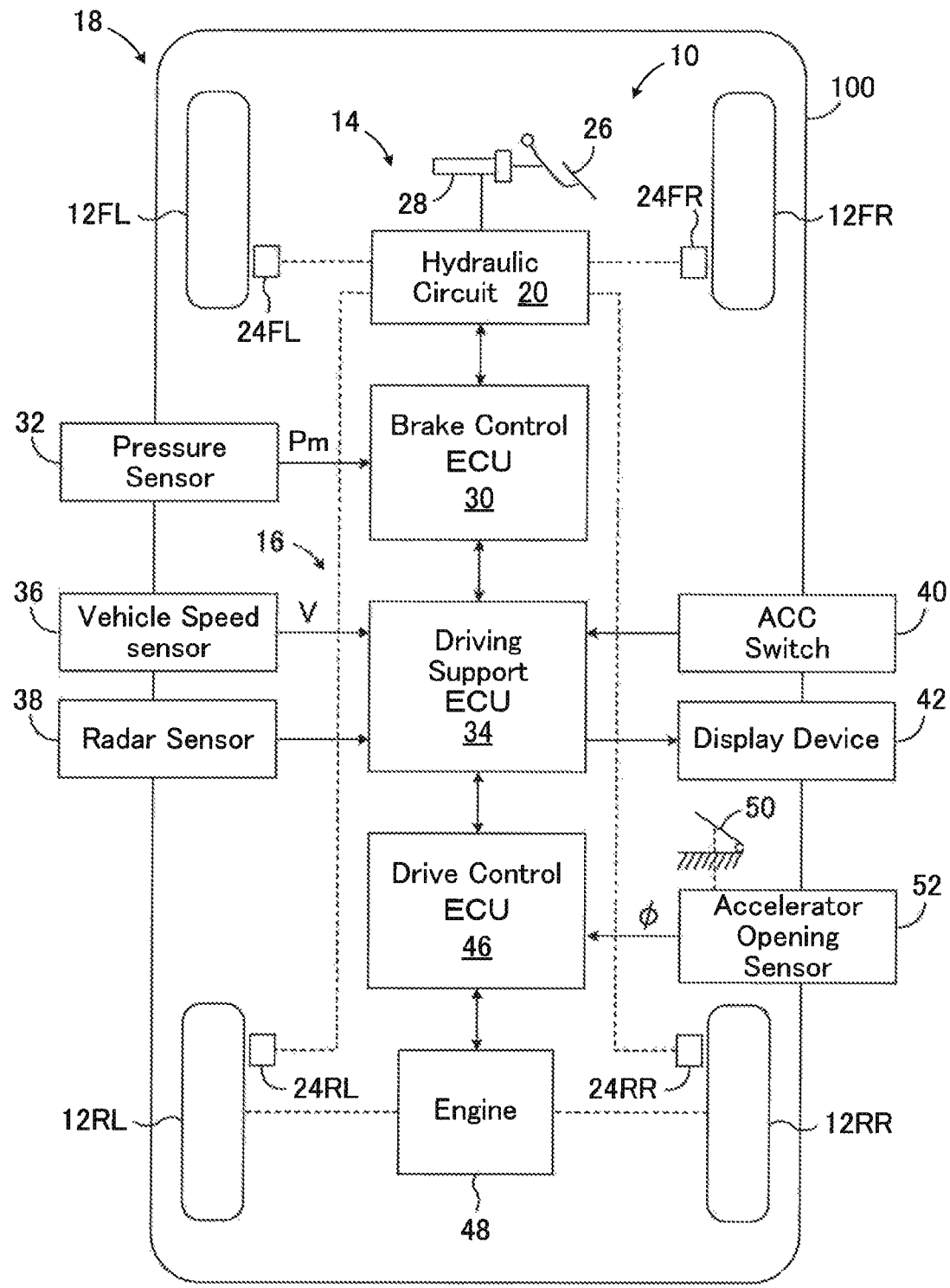
FIG. 1 is a schematic configuration view showing an embodiment of a braking force control apparatus for a vehicle according to the present disclosure.

In FIG. 1, a braking force control apparatus 10 according to an embodiment of the present disclosure is applied to a vehicle 18 having a braking device 14 that applies braking forces to left and right front wheels 12FL and 12FR and left and right rear wheels 12RL and 12RR, and a driving support control device 16 that performs driving support control to support driving of the vehicle 18 by a driver. The left and right front wheels 12FL and 12FR are steered wheels, and although not shown in FIG. 1, they are steered by a steering device in response to steering operation on a steering wheel by the driver. The left and right rear wheels 12RL and 12RR are non-steered wheels.

The braking force control apparatus 10 includes a brake control electronic control unit 30 that controls braking forces of the front wheels 12FL and 12FR and the rear wheels 12RL and 12RR independently of each other by controlling the braking device 14. As will be described in detail later, the electronic control unit 30 cooperates with the driving support control unit 16 and is configured to perform an automatic braking control to generate braking forces of the front and rear wheels when preset conditions are satisfied in a situation where a driver does not perform braking operation.

The braking device 14 includes a hydraulic circuit 20 serving as a brake actuator and wheel cylinders 24FL, 24FR, 24RL and 24RR provided on the wheels 12FL, 12FR, 12RL and 12RR, respectively. The braking device 14 applies braking forces to the wheels by controlling pressures in the wheel cylinders 24FL, 24FR, 24RL and 24RR by the hydraulic circuit 20 to change the braking forces of the wheels, and a front/rear wheel distribution ratio of the braking forces. As shown in FIG. 1, the braking device 14 has a master cylinder 28 that pumps brake oil in response to a driver's depression on a brake pedal 26.

Although not shown in FIG. 1, the hydraulic circuit 20 includes an oil reservoir, an oil pump, various valve devices, etc., and a braking pressure of each wheel cylinder is controlled by the master cylinder 28 which is normally driven according to the driver's depression operation on the brake pedal 26. The master cylinder 28 is provided with a pressure sensor 32 for detecting a master cylinder pressure Pm, and a signal indicating a master cylinder pressure Pm detected by the pressure sensor 32 is input to an brake control electronic control unit 30. In addition, the braking pressure of each wheel cylinder is individually controlled by the hydraulic circuit 20 being controlled by the brake control electronic control unit 30 as necessary. Thus, the braking device 14 can individually control a braking force of each wheel regardless of the driver's braking operation.

The electronic control unit 30 controls the braking pressure of each wheel based on the master cylinder pressure Pm, thereby controlling the braking force of each wheel according to an amount of depression operation on the brake pedal 26, i.e., an amount of braking operation of the driver. In addition, the electronic control unit 30 controls the braking force of each wheel as required based on a request of a driving support electronic control unit 34 of the driving support control device 16 as described later in detail. Further, the electronic control unit 30 controls a front/rear wheel distribution ratio of the braking forces. In the present application, the "electronic control unit" is written as "ECU" as needed.

As shown in FIG. 1, a signal indicating a vehicle speed V detected by a vehicle speed sensor 36 and a signal indicating information ahead of the vehicle 18 detected by a radar sensor 38 are input to the driving support ECU 34. A signal indicating information as to whether or not to perform inter-vehicle distance control is also input to the ECU 34 from an ACC (auto cruise control) switch 40 operated by the driver, and the ECU 34 displays the state of the inter-vehicle distance control on a display device 42. Notably, detection of information ahead of the vehicle 18 may be performed by a camera such as a CCD camera or a laser sensor, or may be performed by any combination of a radar sensor, a camera and a laser sensor.

Although not shown in FIG. 1, the ACC switch 40 includes an inter-vehicle distance control start button, an inter-vehicle distance control end button, and an inter-vehicle distance setting button and a vehicle speed setting button for setting a reference inter-vehicle distance Lc and a reference vehicle speed Vc, respectively. The ECU 34 performs inter-vehicle distance control in accordance with settings of these buttons. That is, the ECU 34 starts the inter-vehicle distance control when the inter-vehicle distance control start button is pressed, and ends the inter-vehicle distance control when the inter-vehicle distance control end button is pressed. During the execution of the inter-vehicle distance control, although not shown, the radar sensor 38 emits radio waves in a millimeter wave band to the front of the vehicle 18 and obtains information ahead of the vehicle 18 by detecting a reflected wave.

When a difference $\Delta V$ (=V−Vc) between a vehicle speed V detected by the vehicle speed sensor 36 and the reference vehicle speed Vc set by the vehicle speed setting button is a positive value, the driving support ECU 34 outputs a braking request to the brake control ECU 30 as necessary so that a magnitude of the vehicle speed difference $\Delta V$ becomes equal to or less than a reference value Va (a positive constant). The ECU 30, when the braking request is input, controls the braking device 14 so that braking forces of the wheels 12FL to 12RR increases (braking force control of constant speed traveling control).

On the other hand, when the vehicle speed difference $\Delta V$ is a negative value, the driving support ECU 34 outputs an acceleration request to a drive control ECU 46 as necessary so that a magnitude of the vehicle speed difference $\Delta V$ becomes equal to or more than a reference value Vb (a negative constant). The ECU 46, when the acceleration request is input, controls an output of an engine 48 such that driving forces of the left and right rear wheels 12RL and 12RR, which are driving wheels, increase (driving force control of constant speed traveling control). In the illustrated embodiment, the vehicle 18 is a rear wheel drive vehicle, but a vehicle to which the present disclosure is applied may be any of a front wheel drive vehicle, a rear wheel drive vehicle, and a four wheel drive vehicle.

Further, the driving support ECU 34 performs inter-vehicle distance control for controlling an inter-vehicle distance between the vehicle 18 (host vehicle) and a preceding vehicle. For example, the ECU 34 determines presence or absence of a preceding vehicle based on the information ahead of the vehicle 18 detected by the radar sensor 38, and, when it is determined that there is a preceding vehicle, estimates an inter-vehicle distance L between the host vehicle 18 and the preceding vehicle.

When an inter-vehicle distance difference $\Delta L$ (=L−Lc) between a distance L and a reference inter-vehicle distance Lc set by the inter-vehicle distance setting button is a negative value smaller than a reference value Lb (a negative constant), the ECU 34 outputs a braking request (a target deceleration Gxat of the vehicle) to the brake control ECU 30 so that the inter-vehicle distance difference $\Delta L$ becomes equal to or more than the reference value Lb and equal to or less than a reference value La (a positive constant). The ECU 30, when the braking request is input, controls the braking device 14 so that braking forces of the wheels 12FL to 12RR becomes braking forces that achieves the target deceleration Gxat (braking force control of inter-vehicle distance control). In the present application, the braking force control of constant speed traveling control and the braking force control of inter-vehicle distance control are referred to as "automatic braking control".

On the other hand, when the distance difference $\Delta L$ is a positive value exceeding the reference value La, the ECU 34 outputs an acceleration request (a target acceleration Gxdt of the vehicle) to the drive control ECU 46 such that the distance difference $\Delta L$ is equal to or less than the reference value La and equal to or more than the reference value Lb. The ECU 46, when the acceleration request is input, controls the output of the engine 48 such that driving forces of the driving wheels 12RL and 12RR become the driving forces that achieve the target acceleration Gxdt (driving force control of inter-vehicle distance control).

Notably, when no braking request is input from the ECU 34, the brake control ECU 30 calculates a target deceleration Gxbt of the vehicle based on a master cylinder pressure Pm indicating a braking operation amount of the driver. Further, the ECU 30 controls the braking device 14 so that braking forces of the wheels 12FL to 12RR becomes braking forces that achieve the target deceleration Gxbt. When no acceleration request is input from the ECU 34, the drive control ECU 46 controls an output of the engine 48 based on an accelerator opening $\varphi$ detected by an accelerator opening sensor 52 provided on an accelerator pedal 50.

The brake control ECU 30, the driving support ECU 34, and the drive control ECU 46 may each include a microcomputer having a CPU, a ROM, a RAM, and an input/output port device, which are connected to one another by a bidirectional common bus. Programs such as braking control and inter-vehicle distance control are stored in the ROM of the corresponding microcomputer, and each control is executed by the corresponding CPU according to the program. Furthermore, the ECUs 30, 34 and 46 transmit and receive mutually necessary signals.

Figure 2:
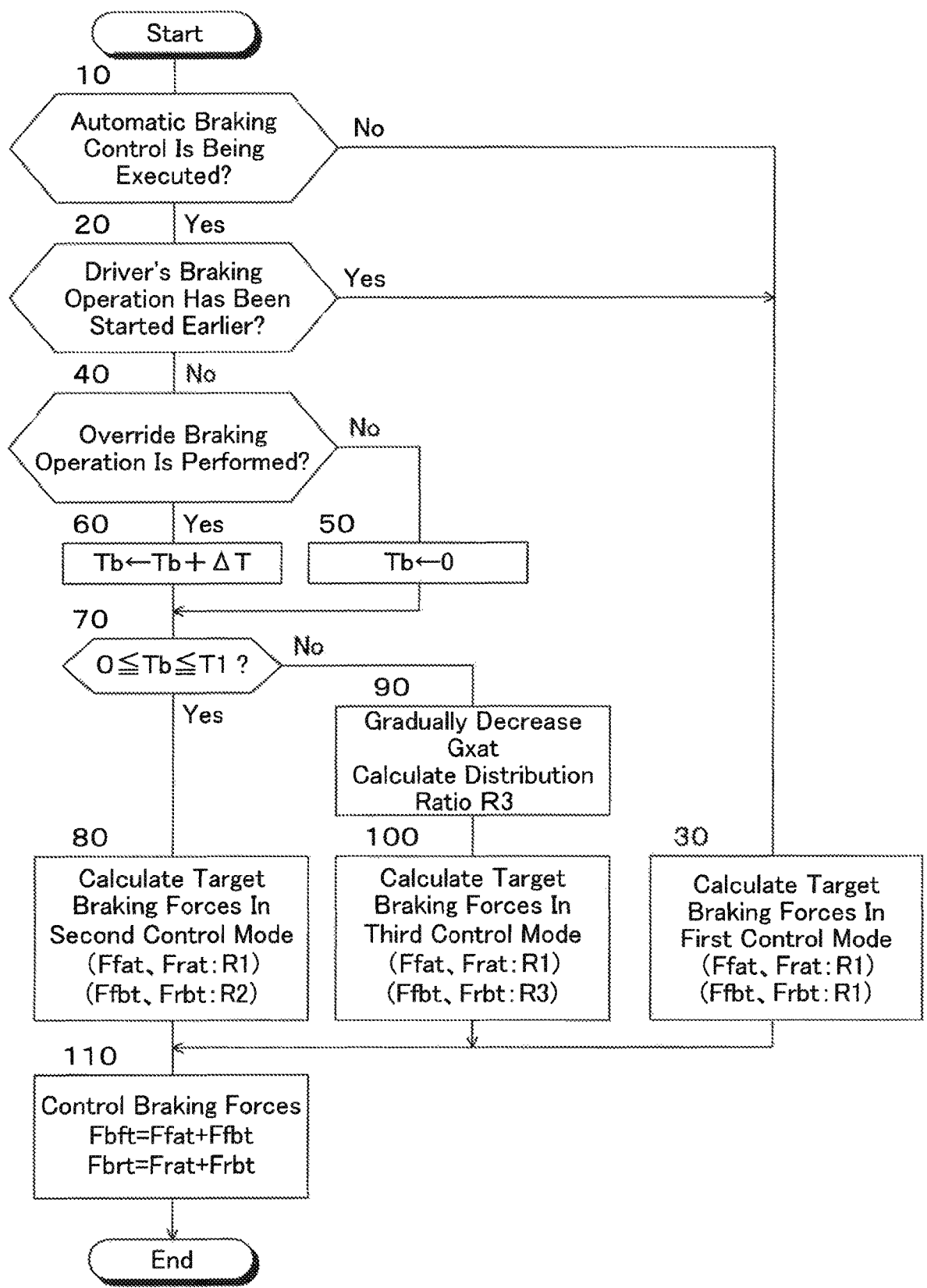
FIG. 2 is a flowchart showing a front/rear wheel distribution control routine of a braking force in the embodiment.

As will be described in detail later, in the embodiment, the brake control ECU 30 performs front/rear wheel distribution control of the braking forces according to the flowchart shown in FIG. 2. In the front/rear wheel distribution control of the braking forces in the embodiment, when braking by a driver's braking operation is performed without braking being executed by the automatic braking control, the front/rear wheel distribution control of the braking forces is performed in a first control mode. The front/rear wheel distribution control of the braking forces is performed in the first control mode also when the braking by the automatic braking control is started in the situation where the braking is being performed by a driver's braking operation.

On the other hand, when braking by a driver's braking operation is started during execution of braking by the automatic braking control, termination control of the automatic braking control consisting of second and third control modes is performed. When braking by the driver's braking operation is started, the front/rear wheel distribution control of the braking forces shifts from the first control mode to the second control mode. When a first predetermined time T1 (a positive constant) has elapsed from a time point when the braking by the driver's braking operation was started, the front/rear wheel distribution control of the braking forces shifts from the second control mode to the third control mode. Further, when a second predetermined time T2 (a positive constant) elapses from a time point when the front/rear wheel distribution control of the braking forces was shifted from the second control mode to the third control mode, the front/rear wheel distribution control shifts from the third control mode to the first control mode (braking by the driver's braking operation).

In the first control mode, the front/rear wheel distribution of the braking forces is performed at a first f front/rear wheel distribution ratio R1 (a positive constant larger than zero and smaller than 1) stored in advance in the ROM. That is, the target braking forces Ffat and Frat of the front and rear wheels based on the automatic braking control are calculated based on the target deceleration Gxat of the vehicle and the first front/rear wheel distribution ratio R1. Similarly, target braking forces Ffbt and Frbt of the front and rear wheels based on the driver's braking operation are calculated on the basis of the target deceleration Gxbt of the vehicle and the front/rear wheel distribution ratio R1.

Note that the first front/rear wheel distribution ratio R1 may be a value obtained in advance such that it corresponds, for example, to a ratio of ground contact loads of the front and rear wheels when the vehicle is in a stationary state, in order to ensure stability during braking of the vehicle. Further, when no braking by the automatic braking control is performed, the target deceleration Gxat of the vehicle is zero.

In the second control mode, the target braking forces Ffat and Frat of the front and rear wheels based on the automatic braking control are calculated based on the target deceleration Gxat of the vehicle and the first front/rear wheel distribution ratio R1 as in the first control mode. On the other hand, the target braking forces Ffbt and Frbt of the front and rear wheels based on the driver's braking operation are calculated based on the target deceleration Gxbt of the vehicle and a second front/rear wheel distribution ratio R2 described later.

In the third control mode, a third front/rear wheel distribution ratio R3 is calculated so as to gradually change from the second front/rear distribution ratio R2 to the first front/rear distribution ratio R1 over the second predetermined time T2. The target braking forces Ffat and Frat of the front and rear wheels based on the automatic braking control are calculated based on the target deceleration Gxat of the vehicle and the first front/rear wheel distribution ratio R1, as in the first control mode. On the other hand, the target braking forces Ffbt and Frbt of the front and rear wheels based on the driver's braking operation are calculated based on the target deceleration Gxbt of the vehicle and the third front/rear wheel distribution ratio R3.

In any of the first to third control modes, the braking device 14 is controlled such that the front wheel braking force Fbf becomes a sum Ffat+Ffbt of the front wheel target braking forces Ffat and Ffbt, and the rear wheel braking force Fbr becomes a sum Frat+Frbt of the rear wheel target braking forces Frat and Frbt. Notably, the braking forces of the left and right wheels are the same, so that the braking forces Fbfl and Fbfr of the left and right front wheels 12FL and 12FR are (Ffat+Ffbt)/2, and the braking forces Fbrl and Fbrr of the left and right rear wheels 12RL and 12RR are (Frat+Frbt)/2. In particular, in the third control mode, the target deceleration Gxat of the vehicle is corrected so as to gradually decrease to zero over the second predetermined time T2.

Note that as described later, the second front/rear wheel distribution ratio R2 is a front/rear distribution ratio of the braking forces at which a pitch moment Mbp given to the vehicle body 100 due to the braking forces Ff and Fr of the front and rear wheels becomes zero, and accordingly, is a value different from the first front/rear wheel distribution ratio R1. The second front-rear distribution ratio R2 was obtained in advance and stored in the ROM of the ECU 30. The calculation of the third front-rear distribution ratio R3 will be described later in detail.

<Description of Second Front/Rear Wheel Distribution Ratio R2>

Figure 3:
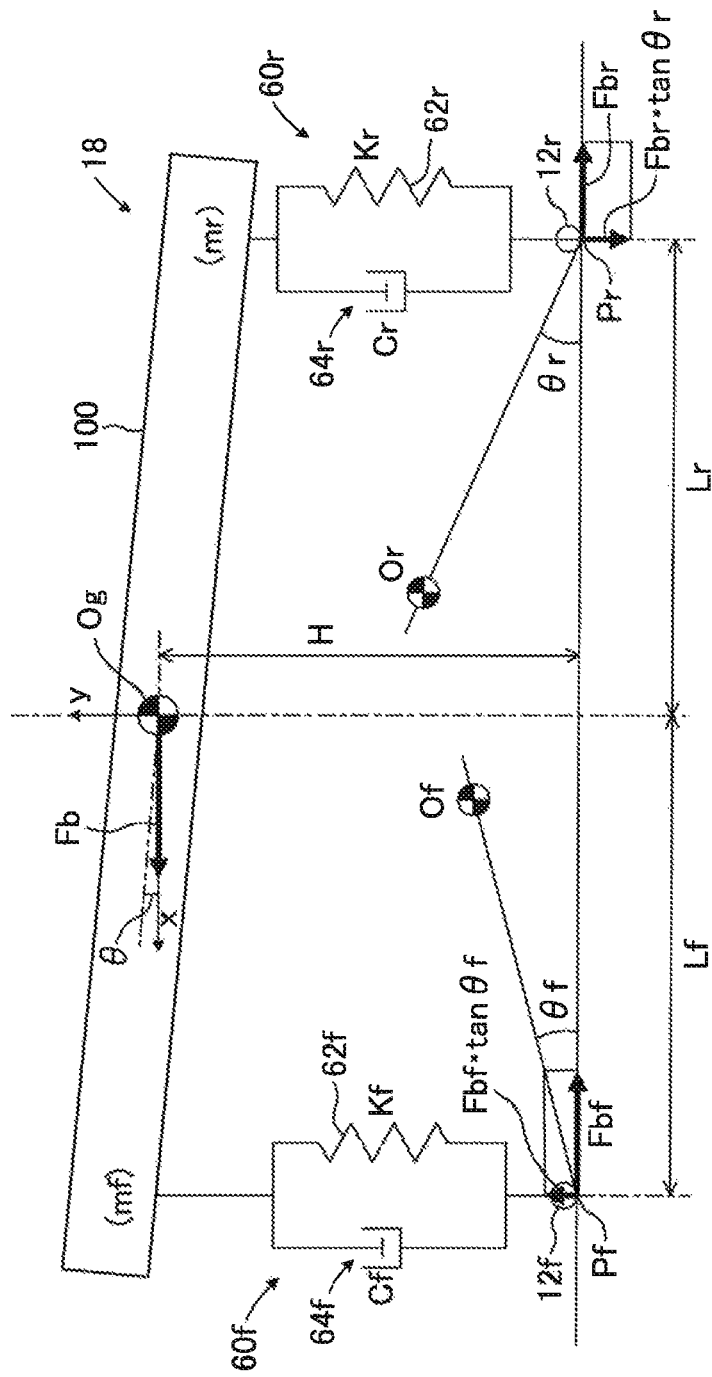
FIG. 3 is a view for explaining a force applied to a vehicle body due to braking forces Fbf and Fbr of front and rear wheels in a two-wheel model in which a vehicle is viewed laterally.

Next, the second front/rear wheel distribution ratio R2 will be described with reference to FIG. 3. FIG. 3 is a view for explaining forces applied to a vehicle body 100 due to braking forces Fbf and Fbr of a front wheel 12$f$ and a rear wheel 12$r$ in a two-wheel model in which a vehicle 18 is viewed in the lateral direction.

In FIG. 3, 60$f$ and 60$r$ denote suspensions for suspending the front wheel 12$f$ and the rear wheel 12$r$, respectively from the vehicle body 100. The suspension 60$f$ includes a suspension spring 62$f$ having a spring constant Kf and a shock absorber 64$f$ having a damping coefficient Cf. Similarly, the suspension 60$r$ includes a suspension spring 62$r$ having a spring constant Kr and a shock absorber 64$r$ having a damping coefficient Cr.

An instantaneous center Of of the front wheel 12$f$ is located at the rear and above of the vehicle with respect to a ground contact point Pf of the front wheel, and an instantaneous center Or of the rear wheel 12$r$ is located at the front and above of the vehicle with respect to a ground contact point Pr of the rear wheel. Further, an angle formed by a line segment connecting the instantaneous center Of and the ground contact point Pf with respect to the horizontal front-rear direction (direction along a x axis) is represented by θ$f$, and an angle formed by a line segment connecting the instantaneous center Or and the grounding point Pr with respect to the horizontal front-rear direction is represented by θr.

As well known in the art, when the braking force Fbf is applied to the front wheel 12$f$, an upward vertical force Fbf·tan θf is generated by the suspension 60$f$ and transmitted to the vehicle body 100. On the other hand, when the braking force Fbr is applied to the rear wheel 12$r$, a downward vertical force Fbr·tan θr is generated by the suspension 60$r$ and transmitted to the vehicle body 100.

A longitudinal distance between an axle of the front wheel 12$f$ and a center of gravity Og of the vehicle 18 is represented by Lf, a longitudinal distance between an axle of the rear wheel 12$r$ and the center of gravity Og of the vehicle 18 is represented by Lr, and a height of the center of gravity Og is represented by H. An upward displacement at the center of gravity Og of the vehicle 18 is represented by y, and a differential value of the displacement y is represented by yd. A pitch angle of the vehicle body 100 whose positive direction is a nose-up direction is represented by θ, and first and second order differential values of the pitch angle θ are represented by θd and θdd.

When the vehicle body 100 moves up and down and pitches, although not shown in FIG. 3, the suspension springs 62f and 62r generate vertical forces by spring forces, and the shock absorbers 64f and 64r generate vertical forces by damping forces. Furthermore, when the braking forces Fbf and Fbr are applied to the front wheel 12f and the rear wheel 12r, respectively, an inertial force equal to a sum Fb (=Fbf+Fbr) of the braking forces Fbf and Fbr acts on the center of gravity Og of the vehicle 18. Therefore, representing that a pitch inertia moment of the vehicle 18 by Ip, the following equation (1) is established as a motion equation of balance of moments around the center of gravity Og.

$$\begin{aligned}
I \cdot \theta dd &= (Fbf + Fbr)H - Kf \cdot Lf(y + \theta \cdot Lf) - Cf \cdot \\
&\quad Lf(yd + \theta d \cdot Lf) - Ff \cdot \tan\theta f \cdot Lf + Kr \cdot Lr(y - \theta \cdot Lr) + \\
&\quad Cr \cdot Lr(yd - \theta d \cdot Lr) - Fr \cdot \tan\theta r \cdot Lr - \\
&= (Lf^2 \cdot Kf + Lr^2 \cdot Kr)\theta - (Lf^2 \cdot Cf + Lr^2 \cdot Cr)\theta d - \\
&\quad (Lf \cdot Kf - Lr \cdot Kr)y - (Lf \cdot Cf - Lr \cdot Cr)yd + \\
&\quad (H - Lf \cdot \tan\theta f)Fbf + (H - Lr \cdot \tan\theta r)Fbr - \\
&= (Lf^2 \cdot Kf + Lr^2 \cdot Kr)\theta - (Lf^2 \cdot Cf + Lr^2 \cdot Cr)\theta d - \\
&\quad (Lf \cdot Kf - Lr \cdot Kr)y - (Lf \cdot Cf - Lr \cdot Cr)yd + \\
&\quad (H - Lf \cdot \tan\theta f)R2 \cdot Fb - (H - Lr \cdot \tan\theta r)(1 - R2)Fb - \\
&= (Lf^2 \cdot Kf + Lr^2 \cdot Kr)\theta - (Lf^2 \cdot Cf + Lr^2 \cdot Cr)\theta d - \\
&\quad (Lf \cdot Kf - Lr \cdot Kr)y - (Lf \cdot Cf - Lr \cdot Cr)yd + \\
&\quad \{(H - Lf \cdot \tan\theta f)R2 - (H - Lr \cdot \tan\theta r)(1 - R2)\}Fb - \\
&= (Lf^2 \cdot Kf + Lr^2 \cdot Kr)\theta - (Lf^2 \cdot Cf + Lr^2 \cdot Cr)\theta d - \\
&\quad (Lf \cdot Kf - Lr \cdot Kr)y - (Lf \cdot Cf - Lr \cdot Cr)yd - \\
&\quad \{H - Lr \cdot \tan\theta r - (Lf \cdot \tan\theta f - Lr \cdot \tan\theta r)R2\}Fb
\end{aligned} \quad (1)$$

The last line in the above equation (1) is a pitch moment Mbp acting on the vehicle 18 due to the braking force Fb, and accordingly, the pitch moment Mbp is expressed by the following equation (2).

$$Mbp = -\{H - Lr \cdot \tan\theta r - (Lf \cdot \tan\theta f - Lr \cdot \tan\theta r)R2\}Fb \quad (2)$$

In order to prevent the pitch angle θ of the vehicle body 100 from changing due to the pitch moment Mbp, it is sufficient if the pitch moment Mbp is zero, so if the coefficient of the braking force Fb in the equation (2) is zero. Therefore, in order to prevent a pitch moment from being generated due to the braking force Fb acting on the vehicle 18 and a pitch angle θ of the vehicle body 100 from changing, the second front/rear wheel distribution ratio R2 is set to a value calculated in advance following the equation (3) below.

$$R2 = \frac{H - Lr \cdot \tan\theta r}{Lf \cdot \tan\theta f - Lr \cdot \tan\theta r} \quad (3)$$

<Front and Rear Wheel Distribution Control of Braking Force>

Next, the front/rear wheel distribution control of braking forces in the embodiment will be described with reference to the flowchart shown in FIG. 2. The front/rear wheel distribution control of braking forces according to the flowchart shown in FIG. 2 is repeatedly executed at predetermined time intervals when an ignition switch (not shown) is ON. In the following description, the front/rear wheel distribution control of braking forces according to the flowchart shown in FIG. 2 is simply referred to as "the distribution control".

First, in step 10, a determination is made as to whether or not the automatic braking control is being executed, that is, whether or not braking force control for the constant speed traveling control or the inter-vehicle distance control is being executed. When a negative determination is made, the distribution control proceeds to step 30, and when an affirmative determination is made, the distribution control proceeds to step 20. Note that a timer Tb described later is reset to zero at the start of the distribution control. A negative determination is also made when a corrected target deceleration Gxata of a vehicle calculated in step 90 described later is zero.

In step 20, a determination is made as to whether or not a driver's braking operation has been started before the start of the automatic braking control. When a negative determination is made, the distribution control proceeds to step 40, and when an affirmative determination is made, the distribution control proceeds to step 30.

In step 30, the front/rear wheel distribution of braking forces in the first control mode is performed. That is, based on the target deceleration Gxat of the vehicle and the first front/rear wheel distribution ratio R1, the target braking forces Ffat and Frat of the front and rear wheels based on the automatic braking control are calculated according to the following equations (4) and (5), respectively. Similarly, based on the vehicle target deceleration Gxbt and the first front/rear wheel distribution ratio R1, the wheel target braking forces Ffbt and Frbt of the front and rear wheels based on the driver's braking operation are calculated according to the following equations (6) and (7), respectively. Note that Mv is a mass of the vehicle 18 and is a positive constant, but may be variably set by estimating a weight of the vehicle.

$$Ffat = Mv \cdot Gxat \cdot R1 \quad (4)$$

$$Frat = Mv \cdot Gxat \cdot (1 - R1) \quad (5)$$

$$Ffbt = Mv \cdot Gxbt \cdot R1 \quad (6)$$

$$Frbt = Mv \cdot Gxbt \cdot (1 - R1) \quad (7)$$

In step 40, a determination is made as to whether or not an override braking operation is performed by the driver. When a negative determination is made, the timer Tb is reset to zero in step 50, and when an affirmative determination is made, the timer Tb is incremented by ΔT in step 60. When step 50 or 60 is completed, the distribution control proceeds to step 70. Note that ΔT is a cycle time of the flowchart shown in FIG. 2.

In step 70, a determination is made as to whether or not the timer Tb is not less than zero and not more than the first predetermined time T1. When a negative determination is made, the distribution control proceeds to step 90, and when an affirmative determination is made, the distribution control proceeds to step 80.

In step 80, the front/rear wheel distribution of braking forces in the second control mode is performed. That is, based on the target deceleration Gxat of the vehicle and the first front/rear wheel distribution ratio R1, the target braking forces Ffat and Frat of the front and rear wheels based on the automatic braking control are calculated according to the above-mentioned equations (4) and (5), respectively. Further, based on the target deceleration Gxbt of the vehicle and the second front/rear wheel distribution ratio R2, the target braking force Ffbt and Frbt of the front and rear wheels based on the driver's braking operation are calculated according to the following equations (8) and (9), respectively.

$$Ffbt = Mv \cdot Gxbt \cdot R2 \tag{8}$$

$$Frbt = Mv \cdot Gxbt \cdot (1-R2) \tag{9}$$

In steps 90 and 100, the front/rear wheel distribution of braking forces in the third control mode is performed. In particular, in step 90, a corrected target deceleration Gxata of the vehicle is calculated by correcting the target deceleration Gxat of the vehicle such that it gradually decreases until it reaches zero over the second predetermined time T2. Further, the third front/rear wheel distribution ratio R3 is calculated according to the following equation (10) such that it gradually changes from the second front/rear wheel distribution ratio R2 to the first front/rear wheel distribution ratio R1 over the second predetermined time T2.

$$R3 = R2 - \frac{R2 - R1}{T2}(Tb - T1) \tag{10}$$

In step 100, based on the corrected target deceleration Gxata of the vehicle and the first front/rear wheel distribution ratio R1, the target braking forces Ffat and Frat of the front and rear wheels based on the automatic braking control are calculated according to the following equations (11) and (12), respectively. Further, based on the target deceleration Gxbt of the vehicle and the third front/rear wheel distribution ratio R3, the target braking force Ffbt and Frbt of the front and rear wheels based on the driver's braking operation are calculated according to the following equations (13) and (14), respectively.

$$Ffat = Mv \cdot Gxata \cdot R1 \tag{11}$$

$$Frat = Mv \cdot Gxata \cdot (1-R1) \tag{12}$$

$$Ffbt = Mv \cdot Gxbt \cdot R3 \tag{13}$$

$$Frbt = Mv \cdot Gxbt \cdot (1-R3) \tag{14}$$

In step 110, a target braking force Fbft for the front wheels and a target braking force Fbrt for the rear wheels are calculated according to the following equations (15) and (16), respectively. Further, the braking device 14 is controlled such that a front wheel braking force Fbf and a rear wheel braking force Fbr become the corresponding target braking forces Fbft and Fbrt, respectively.

$$Fbft = Ffat + Ffbt \tag{15}$$

$$Fbrt = Ffbt + Frbt \tag{16}$$

Operation of the Embodiment

<When Only Braking by the Driver's Braking Operation is Performed>

When braking by the driver's braking operation is performed without braking being executed by the automatic braking control, a negative determination is made in step 10, and steps 30 and 110 are executed, thereby the front/rear wheel distribution control of the braking forces is performed in the first control mode. When braking by the automatic braking control is started in a situation where braking by the driver's braking operation is being performed, affirmative determinations are made in steps 10 and 20, and steps 30 and 110 are executed, whereby the front/rear wheel distribution control of braking forces is performed in the first control mode.

<When Braking by the Driver's Braking Operation is Started During Execution of Braking by the Automatic Braking Control>

In steps 10, 20 and 40, an affirmative determination, a negative determination and an affirmative determination are made, respectively. When an elapsed time from the start of braking by the driver's braking operation is equal to or shorter than the first predetermined time T1, an affirmative determination is made in step 70, and steps 80 and 110 are executed, whereby the front/rear wheel distribution control of the braking forces is performed in the second control mode for the braking forces based on the driver's braking operation.

Accordingly, the front and rear wheel target braking forces Ffbt and Frbt based on the driver's braking operation are calculated based on the vehicle target deceleration Gxbt and the second front/rear wheel distribution ratio R2. As described above, the second front/rear wheel distribution ratio R2 is the front/rear wheel distribution ratio at which the pitch moment Mbp applied to the vehicle body 100 due to the braking forces Ffb and Frb of the front and rear wheels becomes zero. Therefore, it is possible to prevent the pitch angle θ of the vehicle body 100 from changing due to the braking forces Ff and Fr of the front and rear wheels generated based on the driver's braking operation.

For example, a spring constant and a damping coefficient of the pitch rotation of the vehicle 18 are represented by Kpr and Cpr, respectively, and the Laplace operator is represented by s. Further, Lf·tan θf is represented by Af, and Lr·tan θr is represented by Ar. A pitch angle θ (s) of the vehicle body 100 is expressed by the following equation (17). In the following equation (17), Fvb is a sum of the braking forces Ffb and Frb of the front and rear wheels generated based on the driver's braking operation.

$$\theta(s) = \frac{1}{IP \cdot s^2 + Cpr \cdot s + Kpr}[\{(Af - Ar)R2 + Ar - H\}Fvb] \tag{17}$$

The second front/rear wheel distribution ratio R2 is a value calculated according to the above equation (3), that is, a value calculated according to the following equation (18). Accordingly, since the value in the parenthesis { } in the above equation (17) is zero, the pitch angle θ(s) of the vehicle body 100 is zero, and the pitch angle of the vehicle body does not change due to the sum Fvb of the braking forces Ffb and Frb of the front and rear wheels based on the driver's braking operation.

$$R2 = \frac{H - Ar}{Af - Ar} \tag{18}$$

When a time exceeding the predetermined time T1 has elapsed from the time point when braking by the driver's braking operation is started and the elapsed time is equal to or shorter than T1+T2, a negative determination is made in step 70, and steps 90 and 100 are executed. Accordingly, the front/rear wheel distribution control of the braking forces is performed in the third control mode, and the target deceleration Gxat of the vehicle is gradually decreased over the second predetermined time T2 until it becomes zero.

Consequently, the front and rear wheel target braking forces Ffbt and Frbt based on the driver's braking operation are calculated based on the vehicle target deceleration Gxbt and the third front/rear wheel distribution ratio R3. Since the third front/rear wheel distribution ratio R3 is calculated according to the above equation (9), it is the front/rear wheel distribution ratio that gradually approaches the first front/rear wheel distribution ratio R1 from the second front/rear wheel distribution ratio R2. Therefore, the pitch angle θ of the vehicle body 100 can be prevented from greatly changing due to the braking forces Ffb and Frb of the front and rear wheels generated based on the driver's braking operation. Further, the braking force by the automatic braking control is gradually reduced to zero, so that the braking force by the automatic braking control can be prevented from rapidly decreasing.

When a time exceeding a predetermined time T1+T2 has elapsed since the time point when braking by the driver's braking operation was started, the corrected target deceleration Gxata of the vehicle is zero, and the braking force by the automatic braking control is zero. Accordingly, a negative determination is made in step 10, and step 30 is executed, whereby the front/rear wheel distribution control of the braking forces is performed in the first control mode.

Specific Example of Operation of the Embodiment

Figure 4:
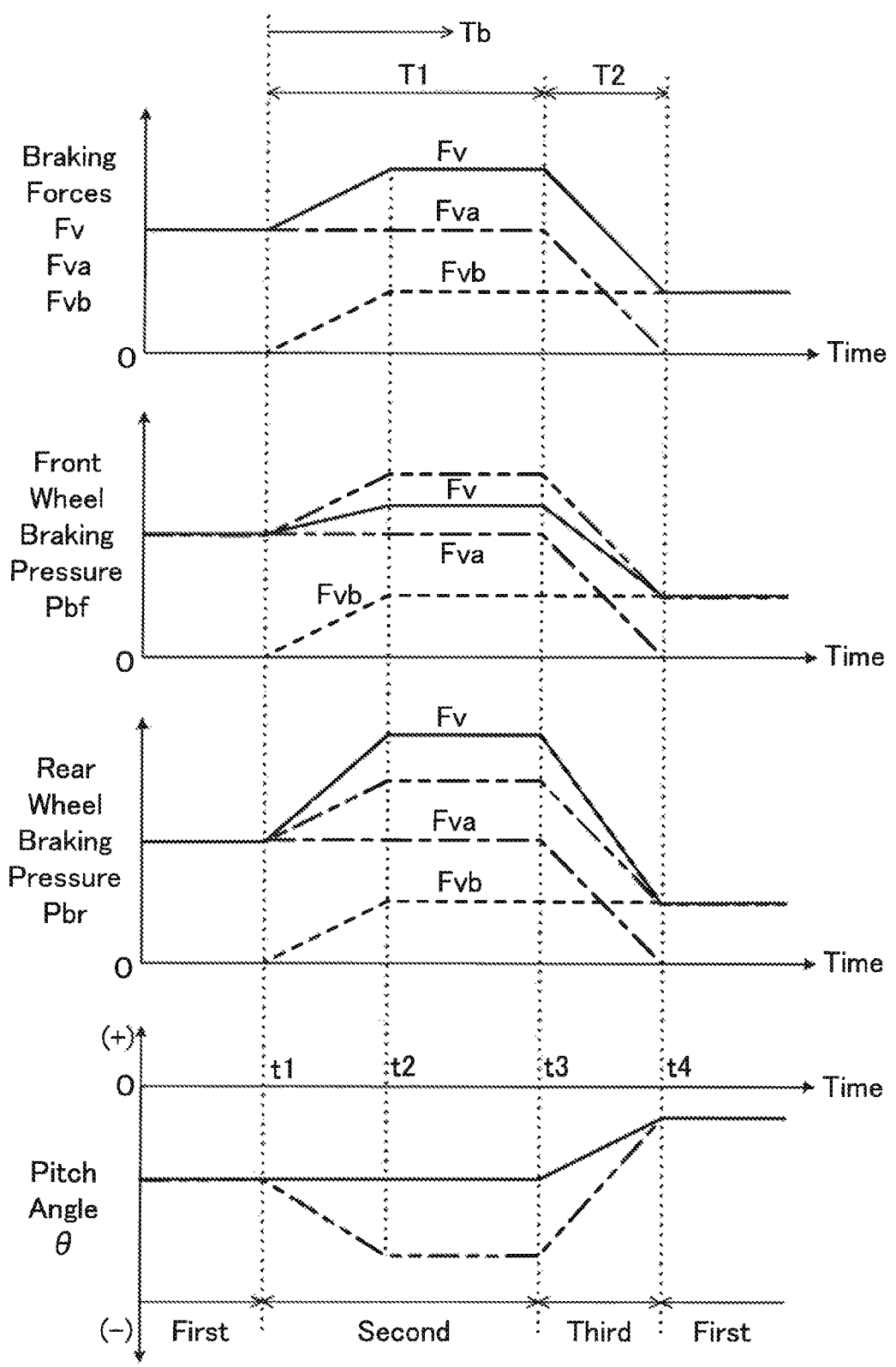
FIG. 4 is time charts showing a specific example of an operation of the embodiment when braking by a driver's braking operation is started during execution of braking by automatic braking control.

Referring to the time charts shown in FIG. 4, a specific example of the operation of the embodiment will be described for a case where braking by a driver's braking operation is started in a situation where a constant braking force Fva is applied to the vehicle by the automatic braking control. In FIG. 4, Fv is a braking force of the entire vehicle, that is, a sum of the braking force Fva of the vehicle by the automatic braking control and the braking force Fvb of the vehicle by the driver's braking operation.

As shown in FIG. 4, it is assumed that the braking by the driver's braking operation is started at time point t1, and the braking force Fvb of the vehicle by the driver's braking operation becomes constant at time point t2. It is also assumed that at time point t3 when the predetermined time T1 elapses from time point t1, the braking force Fva by the automatic braking control gradually decreases, and at time point t4 when the predetermined time T2 elapses from time point t3, the braking force Fva by the automatic braking control becomes zero. After time t4, only the braking force Fvb by the driver's braking operation is applied to the vehicle.

As shown in the lowermost chart in FIG. 4, the front/rear wheel distribution of the braking force is controlled in the first control mode up to time point t1, so that the braking force Fva by the automatic braking control is distributed to the front and rear wheels at the first front/rear wheel distribution ratio R1. From time point t1 to time point t3, the front/rear wheel distribution of the braking forces is controlled in the second control mode, so that the braking force Fva by the automatic braking control is distributed to the front and rear wheels at the first front/rear wheel distribution ratio R1, and the braking force Fvb by the driver's braking operation is distributed to the front and rear wheels at the second front/rear wheel distribution ratio R2.

From time point t3 to time point t4, the front/rear wheel distribution of the braking forces is controlled in the third control mode, so that the braking force Fva by the automatic braking control is distributed to the front and rear wheels at the first front/rear wheel distribution ratio R1, and the braking force Fvb by the driver's braking operation is distributed to the front and rear wheels at the third front/rear wheel distribution ratio R3. Further, after time point t4, the front/rear wheel distribution of the braking forces is controlled in the first control mode, so that the braking force Fvb by the driver's braking operation is distributed to the front and rear wheels at the first front/rear wheel distribution ratio R1.

As shown in the second chart in FIG. 4, the braking pressure Pbf of the front wheel is reduced compared to where the braking force Fvb by the driver's braking operation is distributed to the front and rear wheels at the first front/rear wheel distribution ratio R1 (two-dot chain line) from the time point t1 to the time point t4. On the other hand, as shown in the third chart in FIG. 4, the braking force Pbr of the rear wheel is increased as compared to where the braking force Fvb by the driver's braking operation is distributed to the front and rear wheels at the first front/rear wheel distribution ratio R1 (two-dot chain line) from the time point t1 to the time point t4. Although not shown in the drawing, a diameter of the front wheel cylinders 24FL and 24FR is larger than a diameter of the rear wheel cylinders 24RL and 24RR, so that even if the front and rear wheel braking pressures Pbf and Pbr are the same, the front wheel braking force Fbf is higher than the rear wheel braking force Fbr.

According to the front/rear wheel distribution of the braking force by the second front/rear wheel distribution ratio R2 and the third front/rear wheel distribution ratio R3, by correcting the braking pressure Pbf of the front wheel and the braking pressure Pbr of the rear wheel as described above, the pitch moment Mbp applied to the vehicle body due to the braking force Fvb generated by the driver's braking operation becomes zero. Consequently, from time point t1 to time point t3, the pitch angle θ of the vehicle body 100 is the same as the pitch angle up to time point t1 and does not change. That is, a nose dive angle of the vehicle body does not increase.

From time point t3 to time point t4, the braking force Fva by the automatic braking control is gradually decreased until it becomes zero, so that although the pitch angle θ of the vehicle body 100 changes, the degree of change is smaller as compared to where the braking force Fvb by the driver's braking operation is distributed to the front and rear wheels at the first front/rear wheel distribution ratio R1 (two-dot chain line) in the same manner as the braking force Fva by the automatic braking control.

In the example shown in FIG. 4, for the purpose of simplification, the braking force Fva by the automatic braking control is constant until time point t3, so that the pitch angle θ of the vehicle body 100 is constant until time point t3. If the braking force Fva by the automatic braking control changes, the pitch angle θ of the vehicle body changes accordingly. However, even in the latter case, even if the braking force Fvb due to the driver's braking operation changes, no change in the pitch angle of the vehicle body due to the change of the braking force occurs.

Although the present disclosure has been described in detail with reference to a specific embodiment, it will be apparent to those skilled in the art that the present disclosure is not limited to the above-described embodiment, and various other embodiments are possible within the scope of the present disclosure.

For example, in the above-described embodiment, the second front/rear wheel distribution ratio R2 is the front/rear wheel distribution ratio of a braking force at which a pitch moment Mbp applied to the vehicle body 100 due to the braking forces Fbf and Fbr of the front and rear wheels becomes zero. However, the second front/rear wheel distribution ratio R2 may be any value that is preset to a value different from the first front/rear wheel distribution ratio such that the pitch moment Mbp applied to the vehicle body 100 due to the braking forces Fbf and Fbr of the front and rear wheels becomes a value within a predetermined range including zero.

For example, assuming that the pitch moment calculated according to the above equation (2) is Mbp0 and α is a positive constant, the second front/rear wheel distribution ratio R2 may be set such that the pitch moment Mbp is not less than 0 and not more than Mbp0+a in the case where a braking force Fvb by a driver's braking operation is an allowable maximum value. Further, assuming that the second front/rear wheel distribution ratio at which the pitch moment Mbp is 0 is R20, and β is a positive constant, the second front/rear wheel distribution ratio R2 may be set to a value in the range from R20−β to R20+β.

In a modified example in which the second front/rear wheel distribution ratio R2 is set as described above, the pitch moment Mbp applied to the vehicle body due to the braking forces of the front and rear wheels does not become zero. However, even in the modified example, the change in the pitch angle of the vehicle body can be reduced as compared to where the braking force Fvb by the driver's braking operation is distributed to the front and rear wheels at the first front/rear wheel distribution ratio R1 in the same manner as the braking force Fva by the automatic braking control.

Further, in the above-described embodiment, the predetermined times T1 and T2 are constant. However, at least one of the predetermined times T1 and T2 may be variably set so as to increase as the braking force Fva by the automatic braking control increases.

Further, in the above-described embodiment, the front/rear wheel distribution ratio when only the braking force Fva by the automatic braking control is distributed to the front and rear wheels and the front/rear wheel distribution ratio when only the braking force Fvb by the driver's braking operation is distributed to the front and rear wheels are the same first front/rear wheel distribution ratios R1. However, the front/rear wheel distribution ratio when only the braking force Fva by the automatic braking control is distributed to the front and rear wheels and the front/rear wheel distribution ratio when only the braking force Fvb by the driver's braking operation is distributed to the front and rear wheels may be different from one another.

What is claimed is:

1. A braking force control apparatus for a vehicle, comprising:
   a braking device configured to change a front/rear distribution of braking forces, and
   an electronic control unit configured to execute automatic braking control for controlling the braking device in which, when there is a request for automatic braking from a traveling control device, first target braking forces of front and rear wheels are calculated by distributing a target braking force of the entire vehicle of the automatic braking to the front and rear wheels at a first front/rear wheel distribution ratio, and the braking device is controlled such that braking forces of the front and rear wheels become the first target braking forces of the front and rear wheels, respectively, wherein:
   the electronic control unit stores a second front/rear wheel distribution ratio that is set in advance to a value different from the first front/rear wheel distribution ratio such that a pitch moment applied to a vehicle body due to braking forces of the front and rear wheels is a value within a predetermined range including zero, and is configured to, when a driver starts braking operation during execution of the automatic braking control, calculate second target braking forces of the front and rear wheels by distributing a braking force of the entire vehicle required by the driver to the front and rear wheels at the second front/rear wheel distribution ratio and control the braking device such that a braking force of the front wheels is a sum of the first and second target braking forces of the front wheels and a braking force of the rear wheels is a sum of the first and second target braking forces of the rear wheels; and
   the electronic control unit is configured to calculate a third front/rear wheel distribution ratio which gradually changes from the second front/rear wheel distribution ratio to the first front/rear wheel distribution ratio over a second predetermined time when a first predetermined time has elapsed from a time point when the driver starts the braking operation.

2. The braking force control apparatus for a vehicle according to claim 1, wherein the electronic, control unit is configured to calculate third target braking forces of the front and rear wheels by distributing a braking force of the entire vehicle required by the driver to the front and rear wheels at the third front/rear wheel distribution ratio, gradually reduce a target braking force of the entire vehicle of the automatic braking to zero over a second predetermined time, and control the braking device such that the braking force of the front wheels is a sum of the first and third target braking forces of the front wheels and a braking force of the rear wheels is a sum of the first and third target braking forces of the rear wheels.

3. The braking force control apparatus for a vehicle according to claim 1, wherein the second front/rear wheel distribution ratio is preset such that a pitch moment applied to the vehicle body due to braking forces of the front and rear wheels is zero.

* * * * *